No. 832,301. PATENTED OCT. 2, 1906.
J. ELDRIDGE & P. KRUSE.
SIDE SEAM SOLDERING APPARATUS.
APPLICATION FILED OCT. 10, 1903. RENEWED JULY 21, 1906.
3 SHEETS—SHEET 1.
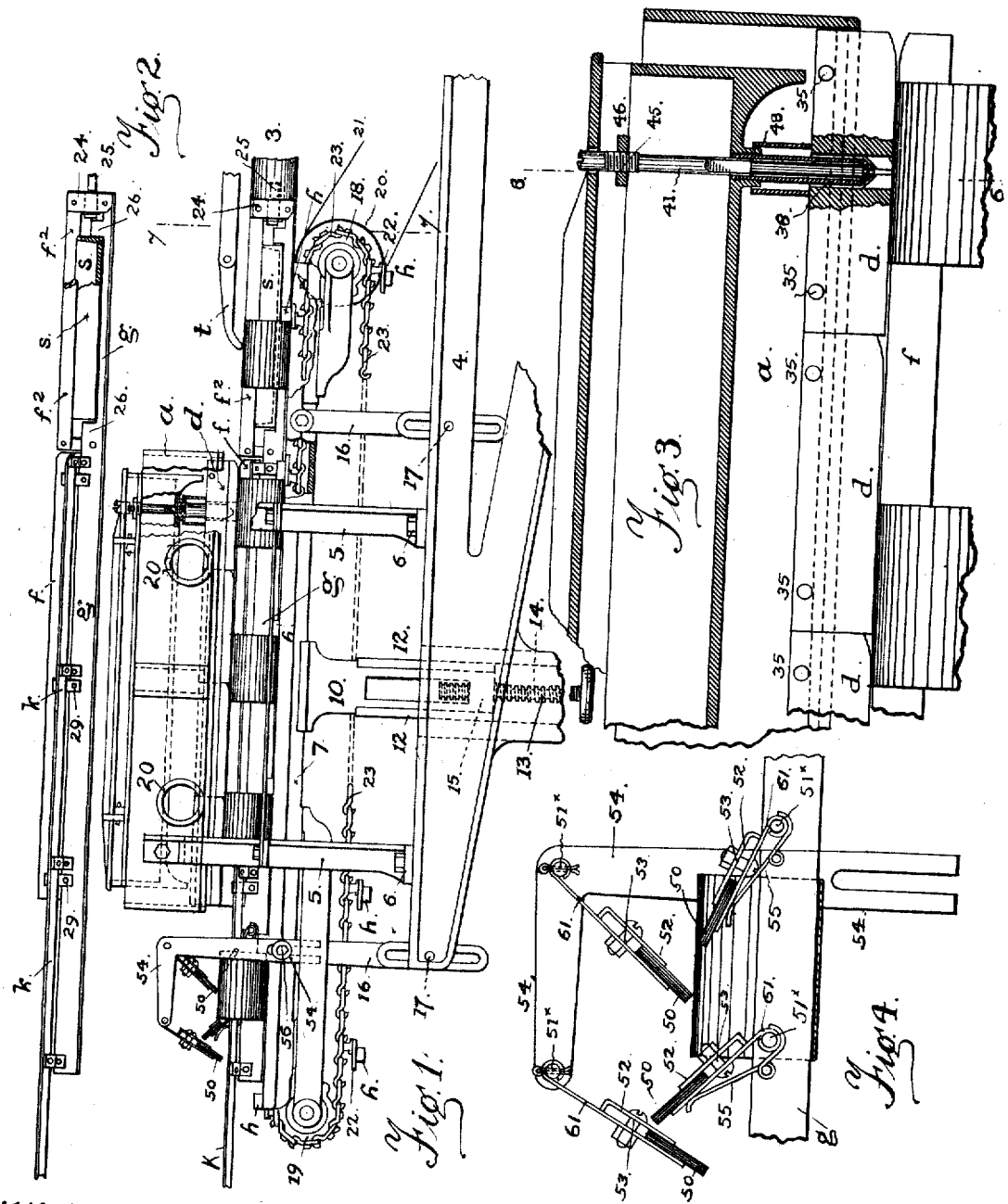
Witnesses.
M. Regner
Arthur L. Slee
Inventors:
John Eldridge
Peter Kruse
per E. E. Osborn
Attorney.

No. 832,301. PATENTED OCT. 2, 1906.
J. ELDRIDGE & P. KRUSE.
SIDE SEAM SOLDERING APPARATUS.
APPLICATION FILED OCT. 10, 1903. RENEWED JULY 21, 1906.
3 SHEETS—SHEET 2.
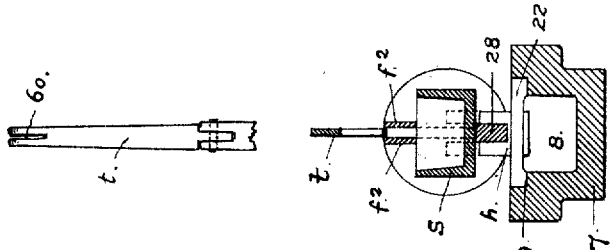
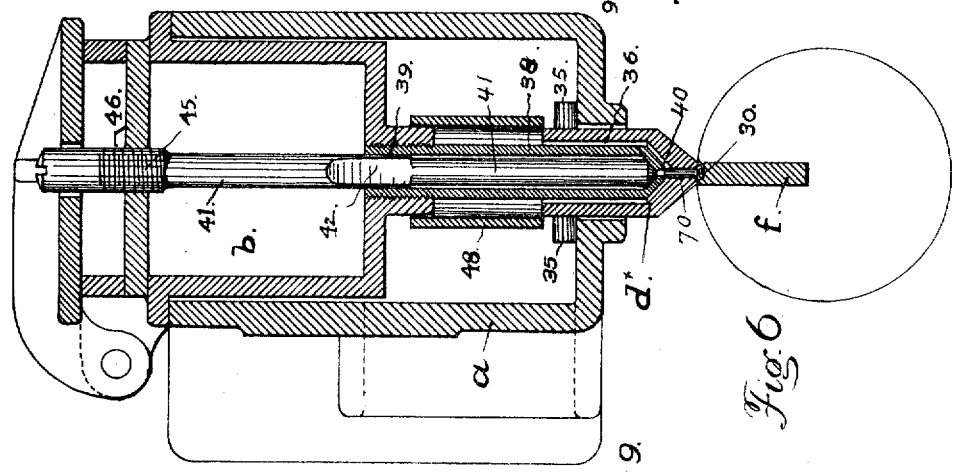
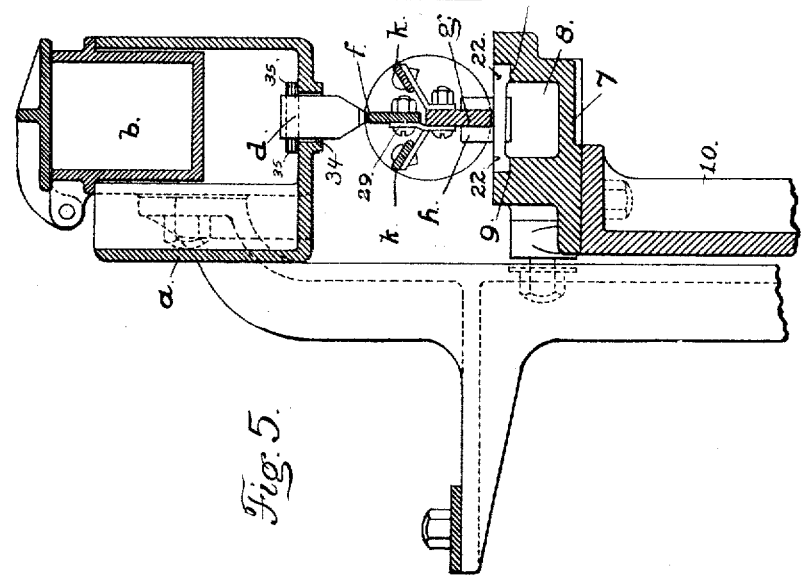
Witnesses.
M. Regner
Arthur L. Slee.
Inventors:
John Eldridge
Peter Kruse
per E. G. Osborn
Attorney.

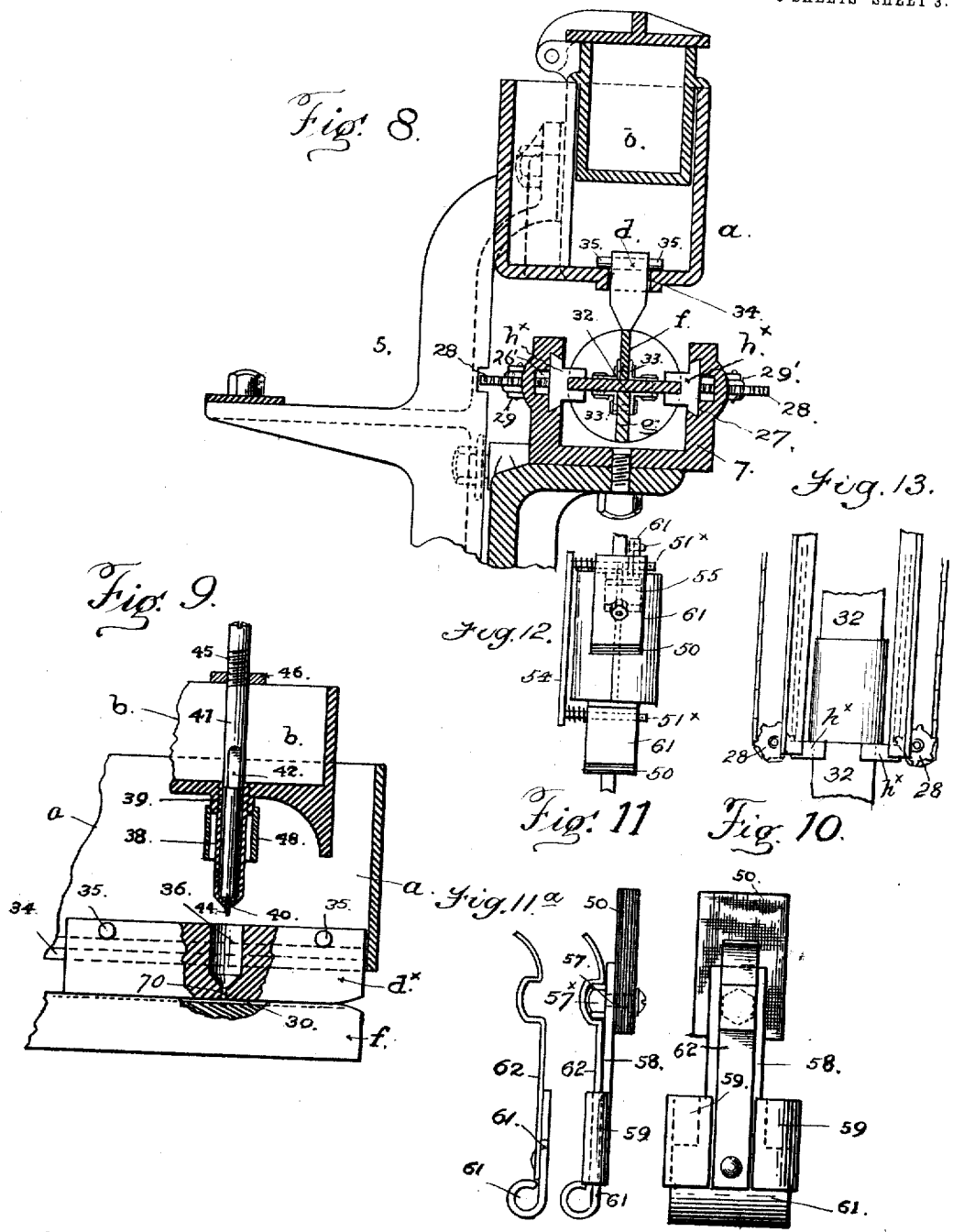

UNITED STATES PATENT OFFICE.

JOHN ELDRIDGE AND PETER KRUSE, OF ASTORIA, OREGON.

SIDE-SEAM-SOLDERING APPARATUS.

No. 832,301.　　　　Specification of Letters Patent.　　　　Patented Oct. 2, 1906.

Application filed October 10, 1903. Renewed July 21, 1906. Serial No. 327,212.

*To all whom it may concern:*

Be it known that we, JOHN ELDRIDGE and PETER KRUSE, citizens of the United States, residing at Astoria, in the county of Clatsop and State of Oregon, have invented new and useful Improvements in Side-Seam-Soldering Apparatus, of which the following is a specification.

This invention relates to machines or apparatus for soldering the side seams of metal can-bodies before the heads are put on.

The object of the invention is chiefly the production of a soldering device or apparatus for use as an adjunct or an attachment to a can-body-forming machine of the kind or description for which Letters Patent were issued to John Eldridge on the 4th day of November, 1902, No. 712,998; but the invention is applicable also to almost all can-body-forming machines in which the sheet-metal blanks are wrapped and the edges joined upon a horn ready for soldering.

The invention embraces several improvements in the construction of soldering apparatus for operating on the seams of can-bodies, especially in the means for supporting and moving the can-bodies along under the soldering-iron for applying and distributing the molten solder along the joint and for regulating the quantity thereof required for the length of the seam and producing a finished joint both on the inside and outside of the can-body.

The nature of the said improvements and the manner in which we have applied and embodied the same in the construction of a side-seam-soldering apparatus are explained at length in the following description, in which the accompanying drawings are referred to by figures and letters.

The drawings represent an apparatus mounted directly on the frame and directly behind the horn or mandrel of a can-body-forming machine, from the end of which the can-bodies are drawn off and carried through the soldering apparatus by an endless traveling carrier.

Figure 1 is a side elevation of a soldering-machine or an apparatus embodying our invention, representing the same mounted on the frame of the body-forming machine at the end of and in line with the horn. Fig. 2 is a side view of the can-body guide removed from the supports. Fig. 3 is a longitudinal sectional view, on an enlarged scale, showing the feeding end of the solder-pot, the soldering-irons, and the stationary bar that supports and presents the can-bodies to the soldering-irons. Fig. 4 is a side elevation in detail of the wipers that act on the inside and outside of the can-body. Fig. 5 is an end elevation, principally in section, of the solder-pot, heating-trough, outside soldering-irons, stationary guides for the can-bodies, and the support of the guide. Fig. 6 is a vertical section taken through the heating-trough, solder-pot, and soldering-irons on the line 6 6, Fig. 3, on an enlarged scale. Fig. 7 is a cross-section taken through the flux-trough on the line 7 7 on an enlarged scale. Fig. 7½ is a top view in detail of the fluxing-finger. Fig. 8 is an end elevation, principally in section, of a modification relating to the can-body guides and its traveling supports. Fig. 9 is a longitudinal sectional view of the leading soldering-irons and the solder-feeding tube and regulating-valve in detail. Figs. 10 and 11 are details of the inside wiper, showing the same in side elevation and in top view. Fig. 11ˣ shows the arm 61 and spring 62 detached. Fig. 12 is a plan view of the devices shown in Fig. 4. Fig. 13 is a plan view of a portion of the endless carriers, showing the sprockets 28 and carrier-blocks $h^\times$ and a portion of the bar 32.

The apparatus shown in the drawings is designed to illustrate the best form or embodiment of our invention for use in connection with a can-body machine of the type having a rotating horn, like the machine covered by Letters Patent No. 712,998, before mentioned, and in connection with the description given below attention is called to the following features, which distinguish this invention from other machines or apparatus for soldering the side seams of cans.

The solder-pot sets in and is inclosed on the sides and bottom by a heating-trough, which, in addition to its office of keeping the solder in fluid state, has the function of a heater for the soldering-irons. In this apparatus the seam is soldered on the inside as well as the outside of the can-body by an inside soldering-iron, and the outside soldering-irons acting jointly on the seam as the can-body is moved along between them, and the soldering-irons that operate on the seam from the outside of the can-body are loosely suspended beneath the heating-trough through a long slot in its bottom in such manner that while the irons are free to play perpendicularly in the slot their weight is carried entirely by the trough and they do not throw any weight on the stationary guide-bar beneath, on which the can-bodies are supported and presented to these outside irons. This construction by which the outside irons are carried by the heating-trough allows the sole of the outside iron to touch or set in working contact with the top bar of the can-body guide without requiring that bar to carry the weight of the outside soldering-irons except during the time a can-body is passing between the outside iron and the top bar, and consequently the top bar of the guide can be relatively thin or narrow, and being composed of a considerably smaller mass of metal than the outside iron it will be heated by frequent contact with the outside irons in the intervals between the traveling can-bodies to a sufficient degree to give the top bar the operation or function of an inside soldering-iron.

The stationary can-body guide is supported by the traveling carriers that move the can-body along through the soldering apparatus, and the construction of this part of the apparatus contains several novel features, in which provision is made for supporting the can-body guide in position with relation to the soldering-irons and for moving the can-bodies as they come from the forming-machine at regular intervals apart. This part of the invention consists chiefly in supporting the can-body guide directly by the endless traveling carriers, which are constructed and supported to attain that end, as more particularly described hereinafter.

Another novel feature is the manner of applying the solder to the seam by feeding or introducing it through the soldering-iron at a point behind the leading end of the iron instead of in advance of the point where the soldering-iron first comes in contact with the seam, the result of which is to heat the metal of the can-body at or in the region of the joint before the solder is applied to it, and thus insure a smooth and continuous flow of the solder along the seam. This feature of the invention embraces also the novel manner of applying the solder for the joint both on the inside and the outside of the seam without excessive waste during the movement of the can-body along the guide, to which end it consists in feeding the solder into a chamber in the first soldering-iron, from which an outlet-passage leading out through the sole of the iron distributes the solder into the seam in the outside of the can-body and also deposits a small quantity of solder at regular intervals in a cavity in the top face of the inside stationary soldering-iron, from which a sufficient quantity is taken up by the moving can-body to finish the seam on the inside as it travels along the stationary iron.

Other novel features are embraced in the devices for applying the flux to the joint and on the wipers for finishing the seam both on the inside and the outside of the can-body.

The device for applying the flux has the form of an oscillating finger supported over a trough into which the free end of the finger drops by gravity and from which it is raised by each can-body as the latter moves along under the finger or between it and the trough. These parts are situated in such relation to each other and to the stationary can-supporting bar that the can-bodies encircling and passing over the flux-trough and under the finger will lift it from the trough and cause the end of the finger to ride on the seam, the intervals between one can-body and the next being sufficient to allow the finger to drop into the flux-trough and take up a fresh quantity of flux for the following can. The end of the finger is grooved or slitted for the purpose of taking up and retaining a greater quantity of the liquid than a solid end will take up when alternately dipped into and withdrawn from the liquid in the trough.

The novel features in connection with the wipers comprise a flexible wiper composed of several folds or layers of coarse fabric, such as canvas, fixed in a clamp, and a pivotally-set frame held in working contact and with sufficient degree of pressure against the can-body by a spring. The clamp is detachably secured to the frame, so that the wiper when worn or burned on the edges can be quickly detached from the frame and replaced by a new wiper without interrupting the operation of the machine.

The invention embraces other novel features with respect to the means that support the can-bodies and carry them along through and under the several working parts of the apparatus, in the construction of which provision is made for adjusting the apparatus to handle and operate on different sizes of can-bodies as the forming-machine from which they are delivered to the soldering apparatus is adjusted to turn out a can-body of another size.

The heating-trough $a$ is supported in the rear of and above the horn 3 of the can-forming machine by standards 5, secured at their lower ends 6 to a stationary bracket 4 and at their upper ends to the sides of the trough. The bracket is bolted to the stationary frame of the body-forming machine, from the rear end of which the body-forming horn 3 extends.

The stationary guide $f g$ and the traveling endless carriers $h$, that move the can-bodies along the guides, are adjustable vertically by the following means: A stationary track formed of a single casting 7, with a channel 8 running longitudinally through its center and with elevated sides provided with guideways 9, having planed top faces, forms a stationary track for the endless traveling carrier.

The casting 7 is supported by a slide 10, fitted to stationary guides 12 and adjustable vertically by an elevating-screw 13. A bearing 14 between the guides and also a threaded socket 15 on the slide are provided for the screw 13, and a hand-wheel on the lower end of the screw furnishes means for turning it. At the end of the channeled piece 7 are attached upright bars 16 with slots for screws 17, by which the bars are fastened to the stationary support 4. The bars 16 serve to support the channeled piece 7 at the outer ends and hold it stiffly after adjustment. At the ends of this part 7 are sprocket-wheels 18 19 for carrying and giving motion to the endless carriers. One of these wheels is connected by a pulley 20 and a belt 21 with some shaft or revolving part on the body-forming machine, from which continuous motion is given to the traveling carrier.

The parts $h$, termed the "carriers," are blocks or projections provided with laterally-extending arms 22, connected together at intervals apart in an endless chain formed by links 23. These traveling carriers, in addition to their work of moving the can-bodies along the stationary guide, also support and hold the can-body guide stiffly in the required horizontal position, especially that portion or member of the guide which forms the inside soldering-iron. This inside support for the can-bodies must necessarily be separate and independent of the soldering-irons that operate on the outside of the can-bodies in order that the cans may pass between them. Owing to the length of this guide and the weight it is called upon to bear additional supports beyond the end where the guide joins the horn 3 are required. For this purpose the traveling endless carrier and the stationary track 7 are constructed in the following manner:

The carrier-blocks $h$ are slotted to take in the bar $g$ of the can-body guide and to slide smoothly along the bar without binding, thus forming cradles in which the bar $g$ is maintained in position and prevented from turning with the horn 3 of the forming-machine. The slotted carriers thus have the double function of moving the can-bodies along the can-body guide and of supporting and holding the guide itself stiffly and in line with the soldering-irons. The slotted carriers $h$ are in turn kept in line and supported under the weight of the load by the stationary track on which the arms travel.

The means provided for setting up the channeled bar 7 to adjust the can-body guide with relation to the soles of the soldering-irons enables the contact and pressure of the irons on the seam to be regulated to the required degree simply by loosening the slotted bars at the ends and raising or lowering the slide 10.

The principal bars $f$ $g$ of the can-body guides are of such dimensions in thickness and are set in such relation to the end of the horn 3 of the body-forming machine that they are included within a circle corresponding to the internal dimensions of the can-body. Additional guides of different sizes are provided where the can-forming machine is adapted by adjustment to turn out can-bodies of different diameters, in which case one can-body guide is removed and another of the required size is substituted. This part of the apparatus is attached to the end of the horn 3 by a yoke 24, having a socket in line with the axis of the horn 3 to take a center pin 25, fixed on the end of the horn. The lower member $g$ of the guide, extending from the yoke to the outer end of the endless traveling carriers from which the soldered can-bodies are discharged, is a continuous bar having for a support at the inner end the horn 3 and at several points in its length supported by the slotted carriers $h$. The top member of the guide is composed in part of two narrow bars $f^2$ from the horn 3 to the adjacent end of the leading soldering-iron, and from that point to the farther end of the last soldering-iron the narrow bar $f$ forms the remaining portion.

Between the bottom bar $g$ and the double bar $f^2$ space is provided for setting the trough $s$, containing the flux, and the bars $f^2$ are separated a sufficient distance for the end of the pivoted finger $t$ to drop between them into the trough. The bottom bar $g$ is cut away below the bar $f^2$, as indicated in Figs. 1 and 2, thereby forming shoulders or abutments 26, between which is mounted a flux-trough.

The finger $t$ is alternately lifted out of the trough to ride on the top of the moving can-body as the latter is carried along and is caused to drop into the liquid contained in the flux-trough by gravity. The end of the finger is grooved or slitted from the point backward, as seen at 60, Fig. 7½, by virtue of which it takes up and retains a greater and a more uniform quantity of liquid than it otherwise would do.

The single bar $f$, forming the remaining portion of the top member of the guide, is supported from the bottom bar by bracket-pieces 29. The side rails $k$ are used mainly for the purpose of insuring the continual alinement of the side seam with the top bar and keeping it in the groove 30 of the bar.

As the bar contains a smaller mass of metal than the soldering-irons $d$ above it and is in contact with one or more of the irons at all times, it becomes heated quickly, and its temperature is maintained sufficiently high to give the bar the function of an inside soldering-iron. The seam thus is finished on the inside as well as the outside of the can-body.

In the modification illustrated in the cross-section, Fig. 8, two sets of traveling carriers are arranged on opposite sides of the channel to support the can-guide and also to drive the can-bodies from the side instead of from beneath. The laterally-extending rail of the can-body guide in this construction is formed of a single bar 32, corresponding in width to the internal diameter of the can-bodies, or approximately so, and to this bar is rigidly secured the top bar $f$ and the bottom bar $g$ by angle-irons 33.

The upright sides of the channeled piece 7 have grooves 27, in which the slotted carrier-blocks $h^\times$ are fitted to slide smoothly, and behind the grooves are recesses 26' for the links that connect the blocks together in an endless belt. Sprocket-wheels 28 at the opposite ends of the channeled support 7 are mounted in brackets 29' to rotate in horizontal planes and are properly connected with a driving-shaft to have continuous motion with like rate of speed. This manner of supporting the can-body guide and driving the can-bodies from the sides instead of from the lower edge alone is of advantage in securing a uniform and steady motion and a true horizontal position of the can-body guide, particularly in operating on can-bodies of the larger sizes.

The trough $a$ is utilized to heat the soldering-irons as well as to keep the solder in a fluid condition for the work. Burners of any well-known type can be employed for the heating agent located at the side of the trough in line with openings 20, through which the flames and gases are directed into the inclosed space around the sides of the solder-vessel $b$ and also in the space under the bottom, which forms the heating-chamber for the outside soldering-irons.

The last-mentioned irons are suspended from the inside of the trough through a slot 34 in the bottom, with the heads of the irons standing above the bottom of the trough and the tips touching the bar $f$ of the can-guide. The irons are loosely hung in the slot by means of cross-pins 35, that prevent them from dropping through the slot and at the same time allow a sufficient extent of vertical play in the slot for the iron to be lifted and ride on the seam as the can-body runs under the irons. These outside irons $d$ and the bar $f$ should be so adjusted with relation to each other that the sole of the iron makes contact with the top bar $f$ sufficiently close to conduct the heat to the bar $f$ without throwing the whole weight of the irons on the bar $f$, and the contact is regulated and controlled by the means provided for vertically adjusting the can-body guide, of which the inside soldering-iron is a member. Each iron is formed of a solid block with the sides beveled to reduce the same at the bottom to a narrow sole or acting face of about the same width as the seam.

The means for feeding and applying the solder to the seam in charges of definite quantity is a novel and valuable feature of this invention, chiefly in the uniform manner in which the apparatus controls and distributes the quantity of solder required to close the seam with a minimum of waste. This feature of the invention consists in feeding the solder from the solder-pot to a recess or chamber in the soldering-iron in drops, the size and the frequency of which are under the control of the operator, and in conducting and distributing the solder along the seam from end to end through an outlet-passage opening through the bottom of the iron. The solder is applied in this manner by the foremost or leading soldering-iron with which the can-body first comes in contact after it passes through the fluxing device, and in the construction of this part of the apparatus the foremost soldering-iron $d^\times$ has a tubular passage 36 extending from the head perpendicularly through the bottom face. A feed-tube 38, fixed in an outlet 39 in the bottom of the solder-pot $b$ above the iron, extends perpendicular down into this passage in the iron, and being somewhat smaller in diameter than the passage, so as to fit loosely in it, the tube has a contracted lower end, with an outlet-aperture 40, through which the solder escapes in drops into the passage through the iron. The discharge of the solder from the solder-pot through this tube is controlled and regulated by a valve formed of a pin 41, having a cylindrical upper portion of the same diameter as the outlet-aperture in the bottom of the solder-pot; but the lower portion lying principally within the passage in the tube 38 affords space around the pin for the solder. The pin is cut away or flattened on the side, as seen at 42, to afford an outlet of sufficient area from the solder-pot into the passage, and its lower end terminates in a pin 44, shaped to fit the outlet 40 at the bottom of the passage. It has a screw-thread 45 near the upper end, working in a threaded bearing 46, for raising and lowering the valve.

The area of the outlet in the end of the passage is varied by screwing the valve up or down, which is readily done by a key or a screw-driver applied to the head of the pin 41, thus allowing the feed to be regulated as the work may seem to require and to be cut off altogether when can-bodies are not running through the apparatus. When the pin is screwed down, the stem 44 fits in and closes the outlet-aperture 40, and by moving the pin up and down the outlet is readily cleaned whenever it becomes choked. By virtue of this construction the solder is supplied from a body or mass of the molten metal with a minimum waste, where the can-bodies necessarily follow one another at intervals in a continuous manner from the can-forming machine, and it will be noticed particularly that the bottom face of the outside iron rests upon the inside soldering-iron and with the outlet-aperture 70 directly over the cavity 30 in the inside iron, so that both parts of the seam are supplied with solder from the same source and are under control through the same valve. That portion of the solder-feeding tube which is exposed to the heat from the burners is protected by a sleeve 48, resting at the lower end on the head of the soldering-iron and loosely fitting the neck around the opening 39 in the bottom of the soldering-trough, that it may move perpendicularly with the soldering-iron. These parts, necessarily being exposed to great heat continuously during the operation of the apparatus and requiring to be renewed from time to time, are detachable from the trough.

Similar provision is made with regard to the wipers that perform the final operation of finishing the outside and the inside of the seam, as these parts also come into contact with the heated surfaces to such an extent as to materially reduce their efficiency in a short time.

The set of wipers 50, that act on the seam from the inside of the can, are hinged to the stationary bottom bar $g$ of the can-guide, and each wiper is pressed upward against the can-body by a stiff spring 55. The outside wipers are attached to a bracket 54 by a hinge-joint $51^\times$ in the same manner, and the body of the wipers in both sets is formed of a coarse cloth, such as canvas, in folds or layers of several thicknesses tightly pressed together in the form of a pad and fastened to the hinged arm, so as to present the front edge across the seam. A flexible wiper of this character readily bending and conforming to the curved surfaces of the can-body, both on the outside and inside, removes all excess of solder from the surfaces and produces a clear and smooth joint; but owing to the liability of becoming charred by the heated surfaces with which it comes in contact, provision is made for setting up the acting edge of the pad, as well as for renewing the pad whenever it has become charred or otherwise affected by the heat sufficiently to reduce its serviceability.

The outside wipers can be adjusted by the bracket 54, that carries them, and that part being secured to the stationary frame by a clamp-screw 56, it can be lowered from time to time as the wipers need setting more closely to the seam without interrupting the operation of the apparatus. The inside wipers being supported from the stationary guide over which the can-bodies travel are not so readily adjusted, and a construction of detachable pad that can be removed when too badly worn and quickly replaced by a new wiper is provided for application more especially to the inside wipers, although the same character of detachable pad can be used to advantage for the outside wiper as well as the inside wiper. This construction last mentioned is shown in Figs. 10 and 11.

The pad 50 is fastened by a bolt and nut 57 and $57^\times$ to a plate 58, on which is a clip 59, formed by bending the plate over upon the body from opposite sides, so as to slip over the end of the hinged arm 61. A flat spring 62, fastened to the arm 61, extends over the plate and is bent at the outer end to fit over the nut on the bolt that clamps the pad to the plate. The arm 61 is bent to fit loosely upon a stud or pin $51^\times$, forming a hinge-joint, on which the arm is movable in an arc.

The spring 62, engaging the nut $51^\times$, serves to hold the plate on the hinged arm and at the same time allows the pad to be easily removed and a new one slipped on whenever repairs are required. The outside wipers are held with required pressure against the can-body from above by springs attached at one end to the bracket at the hinge-joint and the free end bearing upon the pad-carrying arm. The manner in which these wipers are supported and held to the work insures their proper contact on the can-body during their period of action without allowing them to touch the heated surfaces of the can-body guide in the intervals between the traveling can-bodies, which in an apparatus where the can-bodies travel over an inside soldering-iron will necessarily lessen the durability of the pads.

What we claim as new, and desire to secure by Letters Patent, is—

1. In a can-body-soldering machine, the combination of a stationary guide disposed in the range of travel of the can-bodies and traveling carriers for advancing the can-bodies along the guide, said carriers embracing the guide and freely slidable relative thereto and serving to maintain the guide in position and a vertically-adjustable track upon which the carriers and can-body guide are supported.

2. In a can-body-soldering machine, the combination of a stationary guide disposed in the range of travel of the can-bodies, and traveling carriers for moving the can-bodies along the guide said carriers slotted to receive and embrace the under side of the guide to maintain said guide in position and a vertically-adjustable track upon which the carriers are supported.

3. The combination with outside soldering devices, of a can-body guide, traveling carriers slotted to receive and embrace opposite sides of the guide and thereby maintain said guide in position and prevent movement in a lateral direction, a track below the guide and upon which the carriers are supported, and means whereby the track and the superposed parts are vertically adjusted relative to the said soldering devices.

4. The combination of outside soldering devices, a can-body guide, traveling carriers adapted to embrace opposite sides of the guides whereby the guide is maintained in position, said carriers arranged to move the can-bodies along said guide, a vertically-adjustable support for the carriers and guide, an inside soldering device, and means for heating the soldering devices.

5. In a can-body-soldering machine, an endless traveling carrier having spaced blocks engaging and carrying the can-bodies, and a can-body guide comprising a plurality of set-bars adapted to support the can-body from the inside at intervals apart circumferentially, the blocks of the endless traveling carrier being formed to continuously engage and support the can-body guide, and a vertically-adjustable support for the carriers and can-body guide, substantially as set forth.

6. In a can-soldering apparatus, the combination with a can-body guide, a track, endless traveling carriers supported thereby and arranged to support the can-body guide as they move along the same, and means for adjusting vertically the said track, carriers and can-body guide, substantially at set forth.

7. In a can-soldering apparatus, the combination with a set of stationary soldering devices arranged to operate upon the outside of the can-bodies, another set of soldering-irons arranged to operate upon the cans from the inside, means for adjusting the latter soldering-irons in relation to the outside soldering-irons, a chamber arranged above the soldering-irons for melting the solder, and a single source of heat-supplying means arranged to melt the solder and heat both sets of soldering-irons, substantially as set forth.

8. In a can-soldering machine, the combination with the framework, of the soldering-irons and heating-chamber supported thereby, a can-body guide, an endless traveling carrier for moving the can-bodies along the guide, a track upon which the carrier rests when moving adjacent to the can-body guide, and an independent adjustable framework for supporting the can-body guide, the carrier and the track, substantially as set forth.

9. In a can-body-soldering machine a stationary guide, traveling carriers operating to move the can-bodies along the guide, a heating-trough above the stationary guide supported separately thereof, a solder-pot in said trough, outside soldering-irons suspended from the inside of said trough and movable separately thereof, and an inside soldering-iron supported by the stationary guide beneath the outside soldering-irons, said inside iron being heated from the outside irons by contact therewith.

10. In a can-body-soldering machine, a soldering device comprising a vertically-movable soldering-iron adapted to act on the outside of the seam, means for applying solder to the seam beneath the iron, means for keeping the solder in a molten state and for heating the iron, in combination with a stationary inside soldering-iron having contact with the outside soldering-iron to be heated thereby and comprising a solid bar adapted by its position to form a rest for the can-body directly under the seam, a support to which the inside soldering-iron is rigidly attached, and an endless traveling carrier having spaced blocks at intervals apart to continuously support the inside soldering-iron within the can-bodies and to move the can-bodies along the iron, substantially as set forth.

11. In a can-body-soldering machine the combination with an outside soldering-iron and solder-feeding devices, of a stationary can-body guide comprising a top bar, a bottom bar and side rails adapted to support and steady the can-bodies, the outside soldering-iron being parallel with the top bar of the can-body guide and arranged to normally rest thereupon and heat the same, but to be separated therefrom when a can-blank passes.

12. In a can-body-soldering machine, the combination of a stationary guide disposed in the range of travel of the can-bodies, a track below the guide having a channeled upper surface, traveling carriers comprising blocks adapted to embrace the guide and to freely slide relative thereto to push the can-bodies along the guide, said blocks having laterally-extending arms slidable in the channel of the track.

13. In a can-body-soldering machine the combination of a stationary guide disposed in the range of travel of the can-bodies, a track below the guide having a channeled upper surface, endless traveling carriers operable along said track said carriers having slotted blocks adapted to embrace the guide and having laterally-extending arms operable in the channel of the track whereby the guide is maintained in position and prevented from side movement.

14. In a can-body-soldering machine, the combination of a can-body guide, a track below the guide having a channeled upper surface, endless traveling carriers operable along said track and having projecting blocks with slots adapted to receive the guide, said blocks, adapted to push the can-bodies along the guide and having laterally-extending arms slidably engaging the channel of the track, an inside soldering device, and means for heating the soldering device.

15. In a can-body-soldering machine, a can-body guide comprising a top bar adapted to form both a support for the can-body beneath the seam and an inside soldering-iron therefor, longitudinally-set bars adapted to contact with the side of the can-body at intervals apart circumferentially thereof, an outside soldering-iron loosely supported over and in line with the inside soldering-iron and vertically movable in its supports, an endless traveling carrier having spaced blocks at intervals apart adapted to engage the can-bodies and also to support the inside soldering-iron within the traveling can-bodies, and a stationary track for the blocks of the endless carrier, substantially as set forth.

16. The combination of a solder-feeding device, a soldering-iron adapted to operate on the seam from the outside of the can-body, a stationary can-body guide having a relatively narrow top bar that also serves as an inside soldering-iron, a stationary track, an endless traveling carrier having carrier-blocks supported by the track and adapted to move the can-bodies along the guide, and means for simultaneously adjusting vertically both the inner soldering-iron and the track.

17. In a can-body-soldering machine the combination with solder-feeding devices, of soldering-irons operating on the seam from the outside of the can-body, means for heating the solder and the soldering-irons, and a soldering-iron adapted to act on the seam from the inside, and receiving its heat by contact with the outside soldering-iron.

18. A can-body guide comprising a top bar having a relatively narrow top edge adapted to form a soldering-iron for the inside of the can-body, and longitudinally-set stationary guide-bars parallel with the top bar adapted to guide and steady the can-body; in combination, with outside soldering-irons supported in line with the top bar and separately thereof, and means for adjusting the can-body guide with relation to the outside irons to regulate their contact with the seam.

19. The combination of a soldering-iron having a passage leading through the bottom face of the iron, a solder-receptacle located above the iron having an outlet-aperture, a solder-feeding tube leading from said outlet into the iron, a valve for controlling the flow of the solder from the receptacle into the iron and means for setting the valve so as to regulate the flow of solder.

20. The combination of a soldering-pot having an outlet and a tube connecting therewith, said tube having a contracted lower end and an outlet therefrom, a soldering-iron circumscribing the tube and having a passage through its lower end and a valve normally stationary and passing into said tube said valve having a reduced lower end controlling the delivery of solder through the outlet of the tube, and means whereby the valve is adjusted to vary the quantity of the flow.

21. In a can-body-soldering machine a solder-pot, a heating-trough inclosing a heating-chamber beneath the pot, said chamber having a slot in the bottom, of a soldering-iron loosely suspended in the slot and having its head standing above the bottom and its tip extending below the bottom of the trough, said iron having a passage leading through its bottom face and a solder-feeding device comprising a feed-tube extending from an outlet in the solder-receptacle into the iron, and a controlling-valve in said tube, in combination with a stationary can-body support, means for moving the can-bodies along the support, and means for adjusting said support vertically with relation to the bottom face of the iron.

22. In a can-body-soldering machine a wiper comprising a hinged arm, a slidable plate on the arm detachable from it, a pad of flexible fabric detachably fixed on said plate and a spring-clip as a means for securing the plate on the arm.

In testimony whereof we have hereunto set our hands to this specification in the presence of two subscribing witnesses.

JOHN ELDRIDGE.
PETER KRUSE.

Witnesses:
E. E. OSBORN,
M. REGNER.